United States Patent
Svyatkovskiy et al.

(10) Patent No.: US 11,809,842 B2
(45) Date of Patent: *Nov. 7, 2023

(54) MULTI-LINGUAL LINE-OF-CODE COMPLETION SYSTEM

(71) Applicant: MICROSOFT TECHNOLOGY LICENSING, LLC., Redmond, WA (US)

(72) Inventors: Alexey Svyatkovskiy, Bellevue, WA (US); Shengyu Fu, Redmond, WA (US); Neelakantan Sundaresan, Bellevue, WA (US); Shao Kun Deng, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,609

(22) Filed: Jan. 20, 2022

(65) Prior Publication Data

US 2022/0147321 A1 May 12, 2022

Related U.S. Application Data

(63) Continuation of application No. 16/680,328, filed on Nov. 11, 2019, now Pat. No. 11,262,984.

(Continued)

(51) Int. Cl.
*G06F 8/33* (2018.01)
*G06N 3/08* (2023.01)
(Continued)

(52) U.S. Cl.
CPC ............ *G06F 8/33* (2013.01); *G06F 16/9027* (2019.01); *G06F 17/16* (2013.01); *G06F 17/18* (2013.01);
(Continued)

(58) Field of Classification Search
CPC ..... G06F 8/33; G06F 8/71; G06F 8/35; G06F 8/75; G06F 16/9027; G06F 17/18;
(Continued)

(56) References Cited

U.S. PATENT DOCUMENTS

| 2014/0359572 A1* | 12/2014 | Yuen | G06F 8/423 |
| | | | 717/111 |
| 2014/0359574 A1* | 12/2014 | Beckwith | G06F 8/33 |
| | | | 717/113 |
| 2021/0026605 A1* | 1/2021 | Evangelopoulos | G06F 8/36 |

OTHER PUBLICATIONS

Susan Xu, Gender Bias in Machine Translation: Improving Gendered Disambiguation of Pronouns Using Context-Aware Translations, Mar. 29, 2019, [Retrieved on Nov. 9, 2022]. Retrieved from the internet: <URL: https://dash.harvard.edu/bitstream/handle/1/37364657/XU> 55 Pages (1-55) (Year: 2019).*

(Continued)

*Primary Examiner* — Anibal Rivera

(57) ABSTRACT

A code completion tool uses a neural transformer model to generate candidate sequences to complete a line of source code. The neural transformer model is trained using a conditional language modeling objective on a large unsupervised dataset that includes source code programs written in several different programming languages. The neural transformer model is used within a beam search that predicts the most likely candidate sequences for a code snippet under development.

12 Claims, 13 Drawing Sheets

Related U.S. Application Data

(60) Provisional application No. 62/881,736, filed on Aug. 1, 2019.

(51) Int. Cl.
| | | |
|---|---|---|
| *G06N 3/04* | (2023.01) | |
| *G06F 16/901* | (2019.01) | |
| *G06F 17/16* | (2006.01) | |
| *G06F 17/18* | (2006.01) | |
| *G06N 3/088* | (2023.01) | |
| *G06N 5/04* | (2023.01) | |
| G06N 3/084 | (2023.01) | |
| G06F 8/35 | (2018.01) | |
| G06F 8/71 | (2018.01) | |
| G06F 8/75 | (2018.01) | |
| G06N 3/045 | (2023.01) | |

(52) U.S. Cl.
CPC .............. *G06N 3/088* (2013.01); *G06N 5/04* (2013.01); *G06F 8/35* (2013.01); *G06F 8/71* (2013.01); *G06F 8/75* (2013.01); *G06N 3/045* (2023.01); *G06N 3/084* (2013.01)

(58) Field of Classification Search
CPC ...... G06F 17/16; G06N 3/0454; G06N 3/084; G06N 5/04
See application file for complete search history.

(56) References Cited

OTHER PUBLICATIONS

Ben Peters et al., Sparse Sequence-to-Sequence Models, Jun. 12, 2019, [Retrieved on Nov. 9, 2022]. Retrieved from the internet: <URL: https://arxiv.org/pdf/1905.05702.pdf> 17 Pages (1-17) (Year: 2019).*

Jiangming Liu et al., Discourse Representation Structure Parsing, Jul. 15-20, 2018, [Retrieved on Apr. 12, 2023]. Retrieved from the internet: <URL: https://aclanthology.org/P18-1040.pdf> 11 Pages (429-439) (Year: 2018).*

Alessandro Raganato, New Frontiers in Supervised Word Sense Disambiguation: Building Multilingual Resources and, 2017, [Retrieved on Apr. 12, 2023]. Retrieved from the internet: <URL: https://core.ac.uk/download/pdf/153366443.pdf> 141 Pages (1-133) (Year: 2017).*

"Notice of Allowance Issued in European Patent Application No. 20750843.3", dated May 15, 2023, 8 Pages.

"Decision To Grant Issued in European Patent Application No. 20750843.3", dated Sep. 7, 2023, 2 Pages.

"Single-line Code Completion", Retrieved from: https://doc.aws.amazon.com/codewhisperer/latest/userguide/single-line-completion.html, Retrieved Date: Sep. 8, 2023, 1 Page.

Banavalikar, Radhakrishna, "Amazon CodeWhisperer: Build Applications Faster with the ML-powered Coding Companion", Retrieved From: https://www.linkedin.com/pulse/amazon-codewhisperer-build-applications-faster-coding-panavalikar-/?trk=pulse-article, Jan. 22, 2023, 10 Pages.

Barr, Jeff, "Now in Preview—Amazon CodeWhisperer-ML-Powdered Coding Companion", Retrieved From: https://aws.amazon.com/blogs/aws/now-in-preview-amazon-codewhisperer-ml-powered-coding-companion/, Jun. 23, 2022, 3 Pages.

O'Neill, Sean, "AWS CodeWhisperer Creates Computer Code from Natural Language", Retrieved from: https://www.amazon.comscience/latest-news/aws-codewhisperer-creates-computer-code-from-natural-language, Dec. 1, 2022, 7 Pages.

Tabachnyk, et al., "ML-Enhanced Code Completion Improves Developer Productivity", Retrieved From: https://ai.googleblog.com/2022/07/ml-enhanced-code-completion-improves.html, Jul. 26, 2022, 6 Pages.

* cited by examiner

US 11,809,842 B2

MULTI-LINGUAL LINE-OF-CODE COMPLETION SYSTEM

CROSS-REFERENCE TO RELATED APPLICATIONS

This application is a continuation of U.S. Pat. No. 11,262,984, filed on Nov. 11, 2019, which claims the benefit of U.S. Provisional Patent Application No. 62/881,736, filed on Aug. 1, 2019, each of which is incorporated by reference herein in its entirety.

BACKGROUND

Software development environments are often used to aid software developers (i.e., users, programmers, etc.) to develop program code. The software development environment may include a source code editor and other tools that a developer utilizes to write and test their programs. Some software development environments include a code completion feature that provides assistance while the developer is editing code by automatically presenting a list of possible candidates based on one or more characters (e.g., letters, symbols, etc.) that a developer has typed into a source code editor. A popup menu may appear with several suggested code elements that the developer may utilize. This assistance is beneficial since it speeds up the development time and reduces common errors, such as typos.

However, the automatic code completion feature may be problematic when the code completion system does not recognize an out-of-vocabulary code element, requires a lot of memory, takes too long to generate a list of candidates, and/or generates a list of candidates that are not relevant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A multi-lingual line-of-code completion system is used to generate the most likely candidates to complete a line of source code during a source code editing session. A predicted string of characters to complete the line of code may include various types of elements, such as, local variables, methods, arguments, keywords, and delimiters arranged in an ordered sequence. The system uses a model to predict the ordered sequence which is trained using a conditional language modeling objective on a large unsupervised dataset that includes source code programs written in different programming languages (e.g., C, Java, Python, C++).

Each source code program in the training dataset does need not be written in the same programming language. The training dataset may be composed of numerous source code programs, each of which may be written in a different programming language. Each source code program in the training dataset is encoded into a sequence composed of tokens and/or subtokens. The frequently-used elements in a programming language are encoded into tokens and the less frequently-occurring elements are encoded into combinations of characters referred to as subtokens. This reduces the need to store a large vocabulary and provides better accuracy for out-of-vocabulary tokens.

The multi-lingual line-of-code completion system is based on a neural transformer model. In one aspect, the neural transformer model is comprised of multiple decoder blocks. A decoder block includes a multi-head self-attention layer coupled to a multi-layer one-dimensional convolutional neural network. Layer normalization is applied before and after the multi-head self-attention layer in order to reduce the training time of the neural transformer model.

A beam search is used to generate candidate sequences. The beam search uses the top k subtokens/tokens, identified from each iteration of the neural transformer model, to expand a partial candidate sequence of tokens/subtokens likely to complete a line of source code. The beam search generates a search tree but only keeps the top k nodes at each inference level to expand the search. The search ends when the end-of-line token appears as the most probable prediction.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
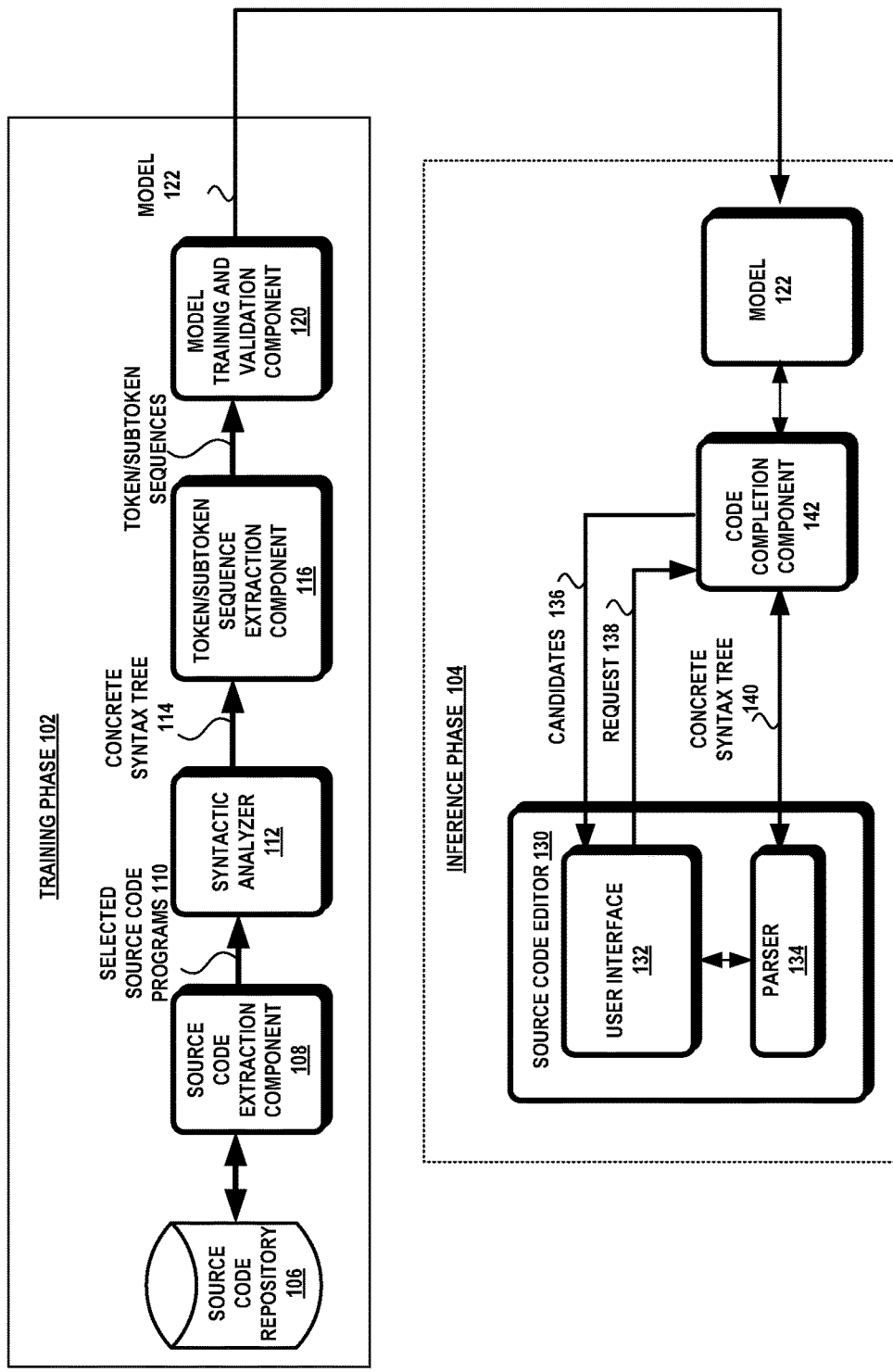
FIG. 1 illustrates an exemplary code completion system having a training phase that generates a neural transformer model and an inference phase that uses the neural transformer model to predict one or more candidate sequences to complete a line-of-code.

The subject matter disclosed pertains to the generation of candidates to automatically complete a line of source code in a program development environment. Code completion is a tool that attempts to predict the next string of characters that a developer (e.g., user, end-user, programmer, etc.) may type into a source code editor. A line of source code may consist of various elements (e.g., keywords, delimiters, variables, methods, constants, operators, etc.) that are combined in a particular order in accordance with the grammar of the underlying programming language to form an expression. The line of source code may be a method invocation, a program statement, a definition, an expression, and so forth. A line of source code does not include a blank line or a comment line and ends with an end-of-line character.

The code completion tool uses a neural network machine learning model to predict the next string of code elements to complete a line of source code. A line of source code refers to a physical line of source code that ends with an end-of-line character and which excludes blank lines and comment lines. The model is trained on an unsupervised dataset that may include source code from different programming languages (i.e., multi-lingual). Unsupervised learning draws inferences from datasets consisting of input data without labeled responses. A vocabulary is formed from these datasets that includes tokens and/or subtokens found in the source code files. A token is a single element in the grammar of a programming language such as a keyword, variable name, operator, delimiter, etc.

Unlike a natural language (e.g., English, etc.), programmers use, at times, arbitrary, complex and long names to represent a variable, function or other code elements which may result in an extremely large vocabulary for the model when a large number of source code programs are used to train the model. To reduce the size of the vocabulary, less-frequently occurring tokens are split into subtokens. A subtoken is a portion of a token that is in between a token and a single character. The subtokens are used to account for rare or unseen tokens (i.e., out-of-vocabulary tokens) that may appear in a target source code program. The use of the subtokens allows the model to learn and generate the out-of-vocabulary tokens.

Byte pair encoding is a data compression technique in which most frequently co-occurring pairs of Unicode characters throughout the training source code dataset are substituted with an out-of-vocabulary character. When applied recursively, the byte pair encoding results in an extraction of token/subtokens in sequences of frequently co-occurring Unicode characters. In one aspect, byte pair encoding is used to extract ordered sequences of Unicode characters to form tokens and subtokens from a syntactic representation of the source code programs of the training dataset. An ordered sequence represents a source code fragment having T tokens/subtokens. The ordered sequences of tokens/subtokens are translated into token/subtoken embeddings and positional embeddings which are vector representations of a source code fragment.

In one aspect, the neural network machine learning model is a multi-layer transformer model. A transformer is a neural network architecture that handles dependencies between its input and output with attention and convolution and without using recurrent neural networks (RNN) (e.g., long short-term memory (LSTM) network). A shortcoming of a RNN-based system is the sequential nature of the RNN where each hidden state relies on the previous hidden state. This makes the RNN-based systems hard to parallelize and unable to take advantage of fast computing devices, such as graphics processing units. Furthermore, RNN-based systems cannot learn long-range dependencies within the input and output sequences for long periods. The transformer overcomes these obstacles with attention. Attention is a mechanism that identifies which parts of an input sequence are relevant to each token/subtoken in the output sequence. The attention mechanism allows the transformer to access the entire input sequence all at once.

A transformer may act as an encoder or a decoder where the encoder maps an input sequence of symbol representations to a sequence of continuous representations and the decoder generates an output sequence of symbols from the sequence of continuous representations. The encoder-decoder architecture is not a good fit for conditional code generation or code completion tasks and is better suited for machine translation and patch generation type tasks. A variant of the transformer model is used that is composed of decoder blocks having masked self-attention and convolutional layers.

A beam search is used to generate one or more candidate sequences to complete a line of source code. The beam search uses the probability distribution generated by the neural transformer model to identify the top k tokens/subtokens likely to be the next token or subtoken in a candidate sequence. The beam search expands the search by instantiating new partial sequences using each of the selected tokens/subtokens identified by the neural transformer model's probability distribution. The search continues generating new partial sequences from the top k tokens/subtokens identified by the output distributions from the neural transformer model until the search ends. The search may end when the end-of-line token appears as the most probable next token.

The task of line-of-code sequence completion is to predict a sequence of response tokens/subtokens, $m_t$, t=0 . . . N, conditioned on an ordered sequence of tokens/subtokens $c_t$, t=0 T, corresponding to a context of code snippet C as the product of conditional probabilities by estimating a conditional probability distribution P(Output|Input) as follows:

$$P(m_0, m_1, \ldots, m_N | c_0, c_1, \ldots, c_T) = \Pi_{i=1}^{N} P(m_i | c_0, c_1, \ldots, c_T, m_0 \ldots m_{i-1\ 1}).$$

In one aspect, a multi-layer transformer-decoder neural network model with multi-head self-attention is utilized to estimate this probability distribution for a source code corpus using an unsupervised autoregressive (AR) technique. The modeling objective is to maximize the following likelihood:

$$\Sigma_i (\log m_i | c_0, c_1, \ldots c_T, m_{i-1\ k}, m_{i-1\ k+1}, \ldots m_{i-1\ 1}; \Theta),$$

where k is the size of the context window, and the conditional probability P is modeled using a neural transformer model with parameters $\Theta$. The parameters may include attention lengths, the number of attention heads, the number of decoder blocks, embedding dimensions, embedding matrices, and the number of hidden units per layer which are trained using a stochastic gradient descent optimization procedure.

The multi-layer transformer decoder produces an output distribution over the tokens/subtokens as follows:

$$h_0 = U \cdot W_e + W_p,$$

$$h_l = \text{transformer block}(h_{l-1}), l=1 \ldots n,$$

$$P(C) = \text{softmax}(h_n \cdot W_e^T),$$

where $C = c_{-k}, c_{-k+1}, \ldots, c_{-1}$ is the context vector of tokens/subtokens, n is the number of layers, T is the ordered sequence length, $W_e$ is the token/subtoken embedding matrix and $W_p$ is the position embedding matrix, e represents an embedding for a token/subtoken in the vocabulary, and p represents an embedding for a position of a token/subtoken.

Attention now turns to a further discussion of the system, devices, components, and methods utilized in the code completion system.

Machine Learning Code Completion System

FIG. 1 illustrates a block diagram of an exemplary code completion system 100 in which various aspects of the invention may be practiced. As shown in FIG. 1, system 100 includes a training phase 102 which trains a transformer model 122 and an inference phase 104 that utilizes the transformer model 122 in a line-of-code completion system. The training phase 102 may utilize a source code repository 106, a source code extraction component 108, a syntactic analyzer 112, a token/subtoken sequence extraction component 116, and a model training and validation component 120.

In one aspect, the training phase 102 pre-trains a transformer model from a diverse corpus of unlabeled source code programs. This is referred to as unsupervised learning since the model draws inferences from the input data without labeled responses. The source code extraction component 108 extracts selected source code programs 110 from the source code repository 106 to obtain the training and validation datasets. The source code repository 106 may be a file archive and web hosting facility that stores large amounts of source code either privately or publicly. The source code repository 106 can be structured as a version control system, such as GIT, Mercurial, etc. The source code programs residing in the source code repository 106 vary and may be written in different programming languages.

The source code extraction component 108 obtains several selected source code programs 110 which may be written in the same or different programming languages. A programming language utilizes a context-free grammar that is a set of rules that describe all possible strings in a formal programming language. The selected source code programs 110 can come from different domains, such as without limitation, scientific computing, web development, dataflow programming, machine learning, and the like.

A syntactic analyzer 112 transforms each of the selected source code programs 110 into a concrete syntax tree 114. The concrete syntax tree 114 represents the source code text in the parsed form. The concrete syntax tree 114 may also be a parse tree. The syntactic analyzer 112 may be a parser, part of a front-end compiler, part of a language compiler, or part of a compilation tool. A concrete syntax tree 114 represents the syntactic structure of a program in a hierarchical or tree structure. The concrete syntax tree 114 is an n-ary tree data structure that includes nodes that represent a construct in the grammar of the programming language of a program. The concrete syntax tree 114 includes one root node, multiple internal nodes, and multiple terminal nodes. The terminal nodes represent the tokens. A token is a symbol that represents an operand or an operator. The concrete syntax tree 114 differs from an abstract syntax tree where the terminal nodes represent operands.

The concrete syntax tree 114 for a selected source code program 110 is passed to the token/subtoken sequence extraction component 116. The token/subtoken sequence extraction component 116 parses the concrete syntax tree 114 of each source code program and outputs a sequence of T tokens and/or subtokens. In one aspect, the token/subtoken sequence extraction component 116 performs byte pair encoding to extract frequently-occurring tokens and to extract subtokens from less-occurring tokens. A subtoken is a portion of a token.

For example, the following line of source code:

loss=tf·reduce_sum(tf·square(linear_model−y))

can be partitioned into the following sequence of tokens/subtokens, each of which are separated by the character "|":

loss|=|tf|·|red|uce|_|sum|(|tf|·|squ|are|(|linear−|_|model|−|y|)|)|

In this example, the token "reduce" has been split into the subtokens "red" and "uce" and the token "square" has been split into the subtokens "squ" and "are".

The T-ordered sequences of tokens are then mapped into numeric vectors and then into an embedding. An embedding is a learned representation for the text-based tokens/subtokens where tokens or subtokens that have a common meaning have a common representation. There is an embedding for each token/subtoken in the vocabulary and a position embedding. The token/subtoken embedding represents the learned representation for the token/subtoken. The transformer model does not read each token/subtoken sequentially and as such, has no knowledge of the token/subtoken's position in a sequence without additional position information. The position embedding is used to embed position information about a token/subtoken's position in a sequence into the transformer model. The token/subtoken embeddings are input into the model training and validation component 120.

The neural transformer model 122 is used in the inference phase 104 of the code completion system. In one or more aspects, the inference phase 104 may be embodied as a function or feature integrated into a source code editor, integrated development environment (IDE), and/or stand-alone application. Code completion may be embodied as a tool or feature that can be an add-on, plug-in, extension and/or component of a source code editor and/or IDE. In one aspect, the inference phase 104 includes a source code editor 130, a code completion component 142, and the model 122.

In one aspect, a source code editor 130 may include a user interface 132 and a parser 134. The user interface 132 includes a set of features or functions for developing (e.g., writing, editing, testing) a source code program. The user interface 132 may utilize a pop-up window to present a list of possible candidates 136 for completion thereby allowing a developer to browse through the candidates and to select one from the list. Alternatively, the candidates may appear inline with the current source code line as the user is typing characters into the source code program.

The parser 134 reads the characters entered into a source code program through the source code editor 130 and generates a corresponding concrete syntax tree 140. The parser 134 also updates the concrete syntax tree 140 as the developer creates and edits the source code in the source code editor 130.

At certain points in the editing process, the user interface 132 will request candidates to complete the current line of source code. The user interface may detect that the user has entered a particular character or string of characters and automatically initiate a request for candidates to complete a line-of-code. This character is referred to as a marker character. In one aspect, the marker character may be an equal sign "=" or a period "." The user interface 132 will then send a request 138 for candidates from the code completion component 142 to present to the developer. Alternatively, the user may request candidates by entering a particular keystroke or sequence of keystrokes, such as the combination of the CTRL key with the whitespace key.

In yet another aspect, the system may automatically display, in a dimmed color, a single top candidate at the end of the current source code line regardless of a marker character. The system builds and continuously updates a tree of candidates in the background regardless of whether the user decides to trigger the candidate or not. The candidate is automatically displayed in the user interface when the user has been idle for a period of time. If the user wants to accept the candidate, the user may type in a particular keystroke or combination of keystrokes (e.g., CTRL and I) to accept the candidate. In this case, the cursor position will advance to the end of the suggested code sequence and the dimmed color of the candidate code will change to the normal color of the code. If the user does not want to use the candidate, the candidate disappears when the user continues typing. In this case, the system would refine the code sequence based on the pre-fix filter of the tree of candidates based on the newly typed code.

The code completion component 142 tracks the characters that are input into the source code editor and services requests for candidates to complete a line of source code. The code completion component uses the model 122 to generate candidates based on the current context of the source code in the editor. The candidates are ranked according to their respective probability with the candidates having the highest probability at the top. A select number of candidates 136 is then returned to the source code editor 130 and displayed in the user interface 132.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the inference phase 104 may be executed in the same computing environment or in a separate computing environment as the training phase 102. The various computing environments are described in further detail below.

Figure 2A:
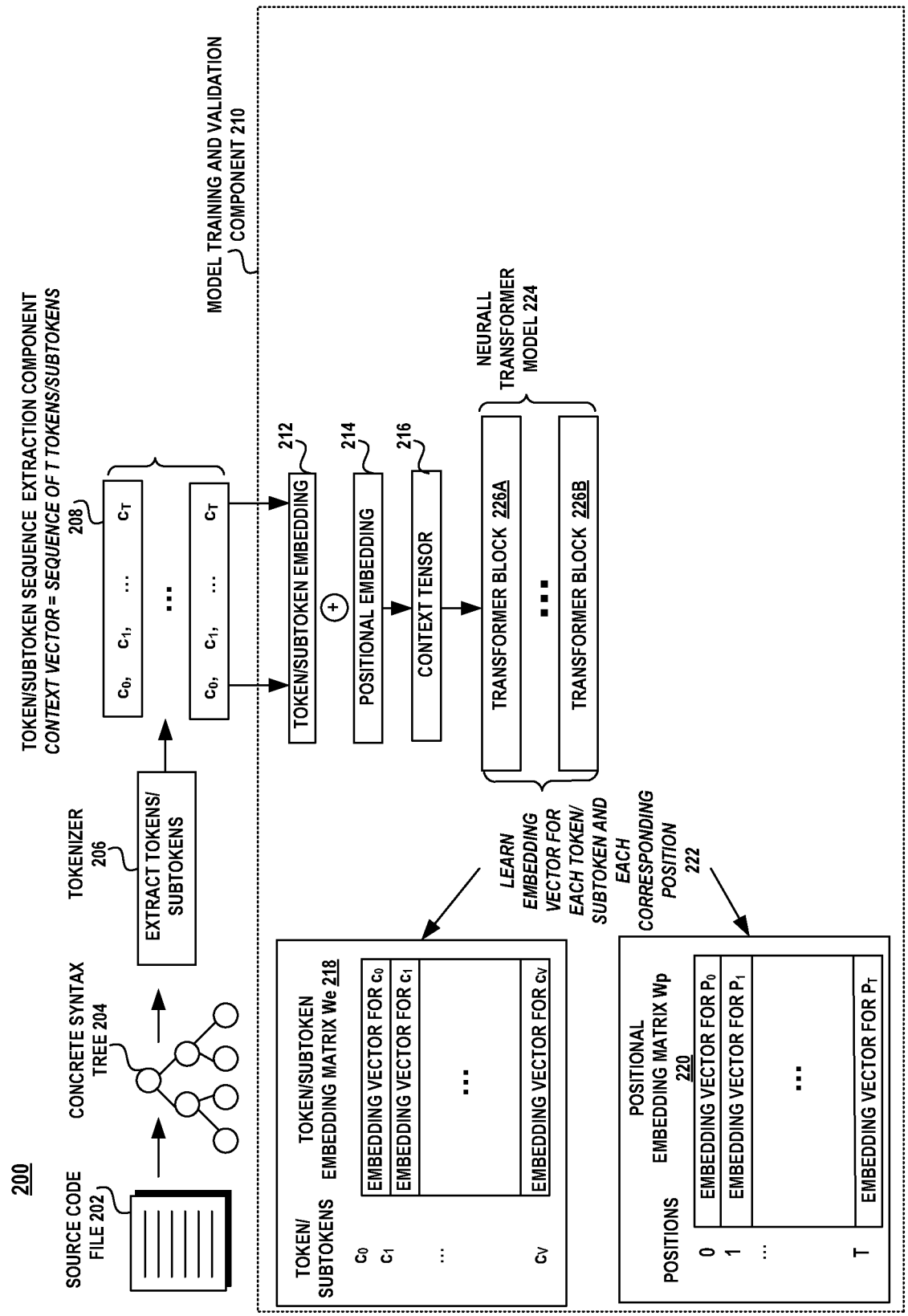
FIGS. 2A-2B are schematic diagrams illustrating an exemplary system and method to train the neural transformer model for line-of-code completion.

Attention now turns to FIG. 2A which illustrates further details of the components and process 200 used to train the neural transformer model. Referring to FIGS. 1 and 2A, the source code extraction component 108 obtains source code programs for use as the training and validation datasets. Each selected source code file 202 is parsed into a concrete syntax tree 204 by a syntactic analyzer 112. The concrete syntax tree 204 is traversed by the token/subtoken sequence extraction component 116. The token/subtoken sequence extraction component 116 may utilize a tokenizer 206 to extract tokens from each line of source code represented by the concrete syntax tree.

In one aspect, byte pair encoding is used as the tokenizer 206. Byte pair encoding is used to build a vocabulary of tokens/subtokens. Although its name uses the word "byte", byte pair encoding operates on Unicode code points and not byte sequences. This encoding technique partitions less-occurring tokens into subtokens and the more frequently occurring tokens are left intact.

The tokens and subtokens of each line of source code are then aggregated into an ordered sequence of token/subtokens consisting of T token/subtokens 208. In one aspect, T is 1024 tokens with each sequence consisting of 1024 token/subtokens and representing a particular context of the source code program. The sequences from the various source code programs are then input to the model training and validation component 210.

Neural networks are trained iteratively, making multiple passes over the training dataset before converging to a minimum. An epoch represents the entire training dataset passed forwards and backwards through the neural network once. Since the training dataset is very large, it is partitioned into smaller batches. The training is iterative and the entire dataset is passed through the neural network in multiple iterations. Each training iteration includes forward propagation, loss calculation, backpropagation steps followed by updating the weights.

The neural network has multiple layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

In one aspect, the hyperparameters may include the following: (1) token/subtoken and position embedding layers of dimensions: 30000×768, and 1024×768 respectively; (2) twelve transformer blocks, with each block consisting of two convolutions, masked self-attention and layer normalization layers; (3) for the training procedure: auto-regressive, with a cross-entropy loss optimization objective; the sequence length is 1024 tokens/subtokens; the mini-batch size is 8; the gradient accumulation steps for each weight update is 8; the Adam stochastic optimization procedure is used to train the neural network; and the learning rate is 0.0001; (4) the data normalization procedure: normalize all string and numerical literals, keeping the ten most frequent; and (5) the vocabulary encoding procedure: extract joint subtoken vocabulary from the multi-lingual code corpus using byte-pair encoding, preserve the ten most frequent string and numerical literals encoding them as a single token during byte-pair encoding procedure; and introduce special control flow tokens to denote end-of-line, end-of-file, decent, and indent symbols.

The training dataset is partitioned into batches with each batch of sequences running through the training process. The sequences are initially transformed into numeric vectors and then embeddings. An embedding is a mapping of discrete categorial variables to a vector of continuous numbers. There is a token/subtoken embedding 212 and a positional embedding 214 for each sequence. The token/subtoken embeddings represent the tokens and/or subtokens in a sequence and the positional embeddings represents the order of a token/subtoken in a sequence.

Initially, random values are used for the initial values of each token/subtoken embedding and positional embedding. Thereafter, the neural transformer model 224 learns the values for each embedding. Upon the completion of the training phase, the embeddings for each token/subtoken and the position embeddings are saved into respective matrices 218, 220 for later use in the interference phase. There is a token/subtoken embedding matrix, $W_e$, 218 that contains an embedding vector for each token/subtoken $C_i$, i=0 . . . V, and a positional embedding matrix, $W_p$, 220 that contains an embedding vector $P_j$, j=0 . . . T, for each position, where V is the size of the vocabulary and T is the length of the token/subtoken sequence.

Each token/subtoken embedding 212 and its corresponding positional embedding 214 are combined to form a context tensor 216. A tensor is a mathematical object that has indices and components that follow certain transformation rules. The tensor is a partially defined computation. It is a generalization of vectors and matrices and represented as an n-dimensional array. The tensor in this instance represents a context of a source code program. The size of the context tensor 216 is T×size of the embedding vector (e.g., embedding size), where T is the length of the token/subtoken sequence.

Figure 2B:
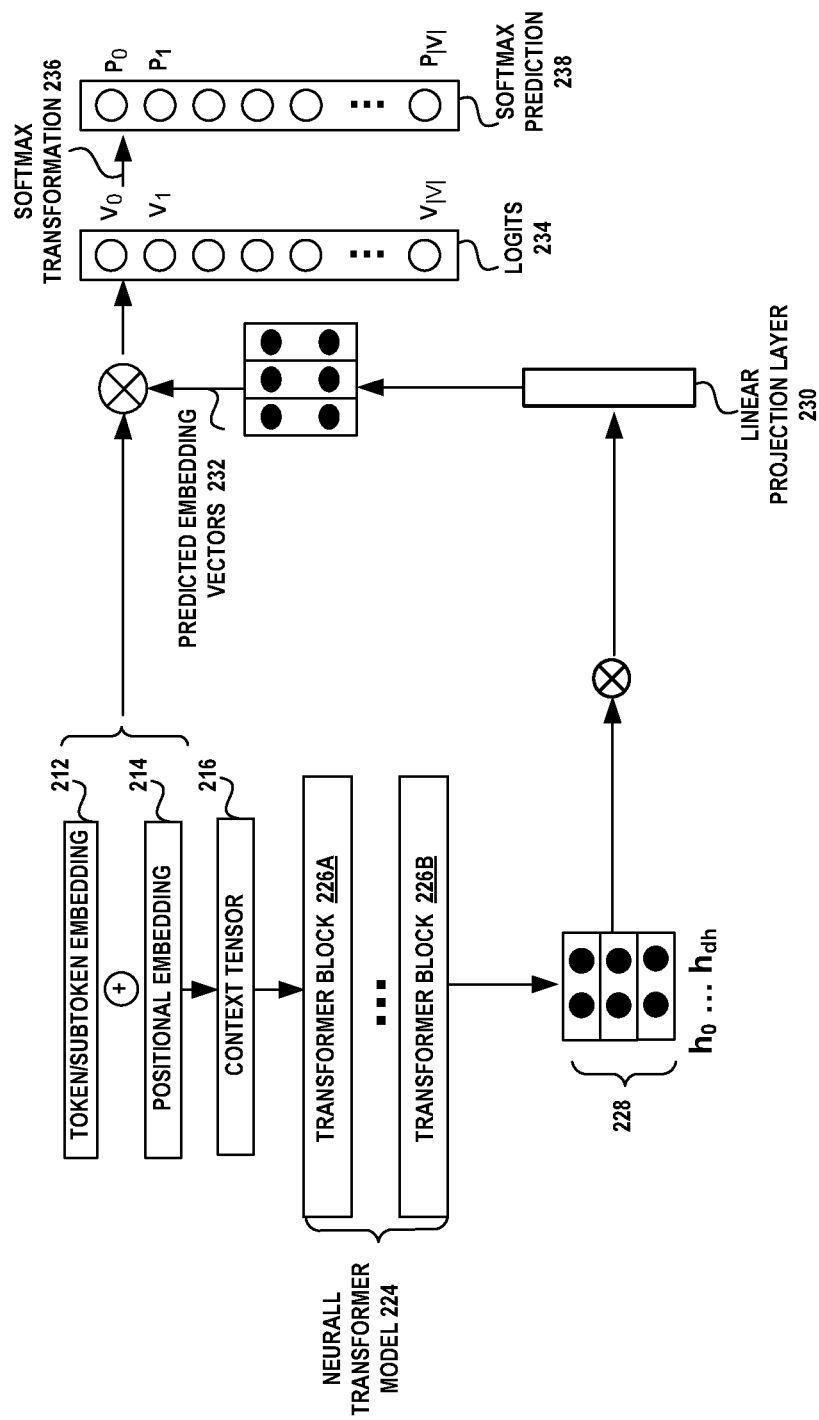

Turning FIG. 2B, the token/subtoken embeddings 212 are learned together with the parameters of the neural transformer model. The output hidden state of neural transformer model 228 is then multiplied by the linear projection matrix A 230. The linear projection matrix A is defined as $A=a_{ij} \in R^{dh \times dx}$. The hidden state vector $h_T \in R^{dh}$ encodes information learned by neural transformer model 224 from the context tensors 216. Finally, a probability distribution for each token/subtoken $P_{|V|}$ 238 is generated by getting the unnormalized logits predictions 234 as $y_k=\Sigma_j l_{kj} l_j^{pred}+b_k$, where $b_k$, $k=0 \ldots |V|-1$ is the bias vector, and then normalizing them using softmax function 236.

Figure 3:
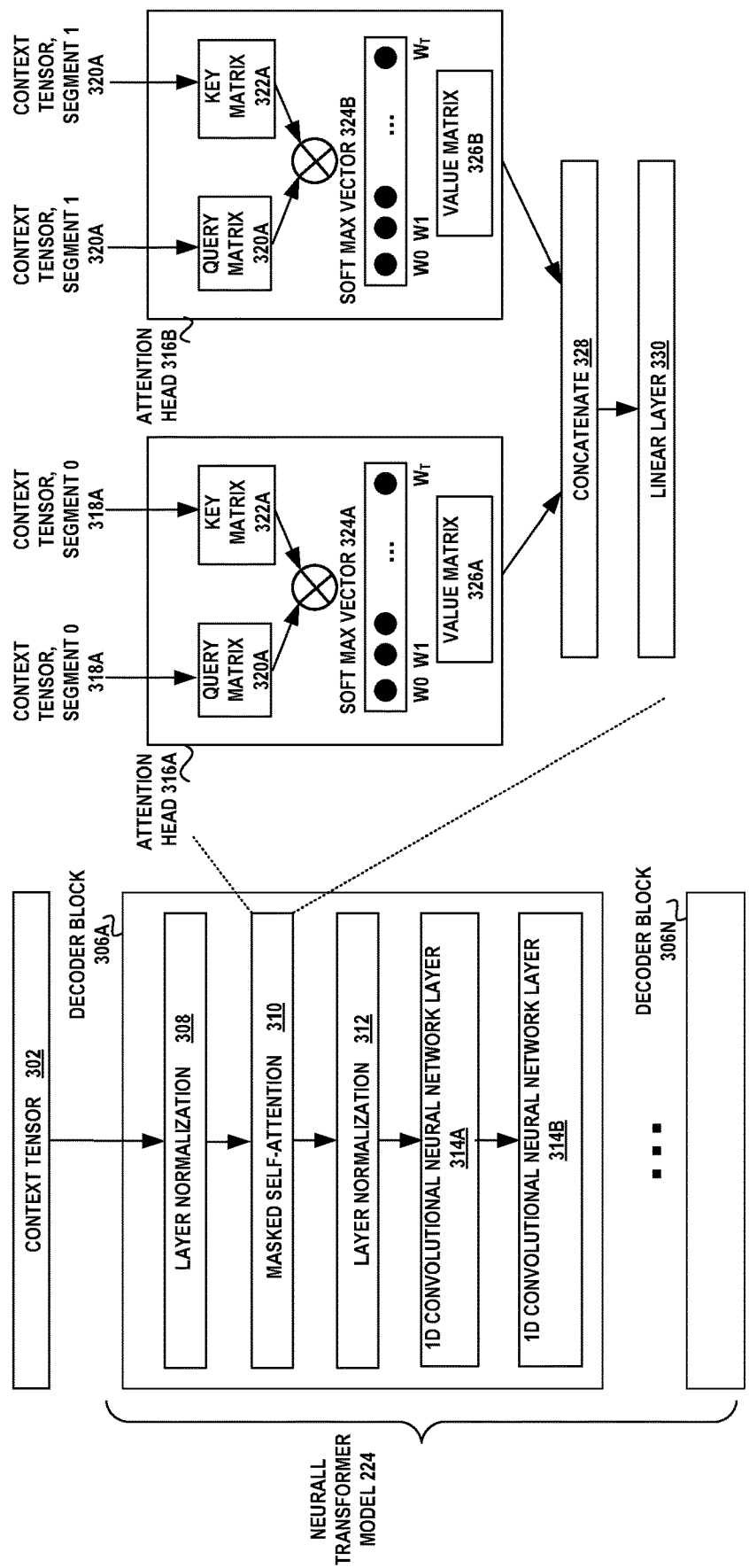
FIG. 3 is a schematic diagram illustrating an exemplary architecture of the transformer block shown in FIG. 2.

Turning back to FIG. 2A, the neural transformer model 224 may be composed of one or more transformer blocks 226A, 226B. Referring to FIG. 3, a transformer block 226 may configured with encoder and decoder blocks and/or with only decoder blocks. FIG. 3 shows one aspect of the neural transformer model 224 configured with multiple decoder blocks 306A, 306N. A decoder block 306A, 306N may include a first normalization layer 308, followed by a masked self-attention layer 310, followed by a second normalization layer 312, and two layers of a one-dimensional convolutional neural network 314A, 314B.

The training of a neural network is a time-consuming task. In order to reduce the training time, layer normalization is used. Layer normalization normalizes the inputs across the features. The mean and standard deviation is computed across the feature dimensions. There is a first layer normalization 308 that precedes the masked self-attention layer 310 and a second layer normalization 312 that follows the masked self-attention layer 310.

Each token/subtoken flows through all the decoder blocks 306A, 306N along its own path. The masked self-attention layer 310 allows the neural network to focus on certain features or inputs. Attention is described in "Attention Is All You Need," by Vaswani et al., in 31$^{st}$ Conference on Neural Information Processing Systems (NIPS 2017), Long Beach, Calif., as "mapping a query and a set of key-value pairs to an output, where the query, keys, values, and output are all vectors. The output is computed as a weighted sum of the values, where the weight assigned to each value is computed by a compatibility function of the query with the corresponding key."

In one aspect of the disclosure, the masked self-attention layer 310 consists of two or more attention heads, 316A, 316B. The multi-head self-attention heads run through the scaled dot product attention multiple times in parallel. Each attention head 316A, 316B operates on a portion of the context tensor 302. Attention head 316A operates on a first segment 318A and attention head 316B operates on a second segment 320A. Each attention head 316A, 316B operates on an input sequence $x=(x_1, \ldots, x_n)$ of n elements and computes a new sequence of the same length $z=(z_1, \ldots, z_n)$. Each output element $z_i$ is computed as a weighted sum of linearly transformed input elements:

$$z_i = \Sigma_{j=1}^n \alpha_{ij}(x_j W^V).$$

Each weight coefficient, is computed using softmax function:

$$\alpha_{ij} = \frac{\exp e_{ij}}{\sum_{k=1}^n \exp e_{ik}},$$

where $e_{ij}$ is the scaled dot product $$e_{ij} = \frac{(x_i W^Q)(x_j W^K)^T}{\sqrt{d_z}}.$$

The input into each attention head 316A, 316B consists of a query matrix 320A, 320B and a key matrix 322A, 322B, both of dimension, $T \times d_x$, where T is the code sequence length and $d_x$ is the embedding dimension. The dot product is generated from the query matrix 320 with all the keys from the key matrix 322, with the softmax function applied to obtain the weights, $W_0 \ldots W_T$, 324A, 324B, on the values resulting in a respective value matrix 326A, 326B. The resulting values from the two value matrices are then concatenated 328 and then linearized 330. The concatenation layer 328 takes $T \times d_v$ dimensional key matrices from each attention head to form a $T \times d_v$ dimensional matrix. The linear layer 330 takes the output of the concatenation layer 328 and applies a linear transformation according to: output=input·$W^T$+b, where the input is a $T \times d_v$ matrix, W is a $d_v \times d_v$ dimensional matrix, b is a $T \times d_x$ dimensional matrix, and output is the $T \times d_x$ dimensional matrix obtained as a result of matrix multiplication and addition.

Layer normalization 312 is then applied to the output of the masked self-attention layer 310. The output of layer normalization 312 is then applied to the first neural network layer. In one aspect, there are two neural network layers with each layer consisting of a one-dimensional convolutional neural network. Given an input tensor of dimensions ($d_x$, T), and convolutional kernel g, the 1D convolution operation is defined as:

$$\text{output}=\text{bias}+\Sigma_{k=0}^{dx-1} g(4dx,k)*\text{input, where the}$$
$$\text{operation * is the sliding dot-product operation.}$$

Turning to FIG. 2B, the output of the neural network at the last temporal step T is the hidden state vector $h_T$ 228 which encodes information learned by the transformer blocks 226A,B relevant to the token/subtokens. The output hidden state of neural transformer model 224 is then multiplied by the linear projection matrix A 230 defined as $A=a_{ij} \in R^{dh \times dx}$. The hidden state vector $h_T \in R^{dh}$ 228 encodes information learned by neural transformer model from the context tensors. Finally, a probability distribution for each token/subtoken $P_{|V|}$ 238 is generated by getting the unnormalized logits predictions 234 as $y_k=\Sigma_j l_{kj} l_j^{pred}+b_k$, where $b_k$, $k=0 \ldots |V|-1$ is the bias vector, and then normalizing them using softmax function 236.

Attention now turns to a description of the components of the model used in the inference phase. The inference phase utilizes a beam search to find the most likely candidate sequences. A beam search iteratively generates tokens/subtokens by invoking the neural transformer model. The output of the neural transformer model is a matrix of token probabilities for each position in a candidate sequence. The beam search concentrates on the k most probable tokens at each iteration to get the best path to the most likely candidate sequence. At each iteration, each of the k most probable tokens are concatenated with the tokens in the preceding iterations to form a partial candidate sequence.

A beam search uses a breadth-first search to build a search tree. The search tree is composed of nodes at one or more inference levels. Each node represents a probability distribution generated by the neural transformer model for the tokens/subtokens in the model vocabulary. At each level, only the top k tokens/subtokens having the highest probabilities from the output distribution generated by the neural transformer model are expanded to the next inference level. The variable k is preconfigured and also referred to as the beam width. Each of the k subtokens/tokens is then expanded into a search that updates the current context sequence with the selected subtoken/token to input into the neural transformer model to generate an additional probability distribution for the next token in a sequence. This process is repeated until the end of a line token is predicted as being the next likely token candidate.

Figure 4A:
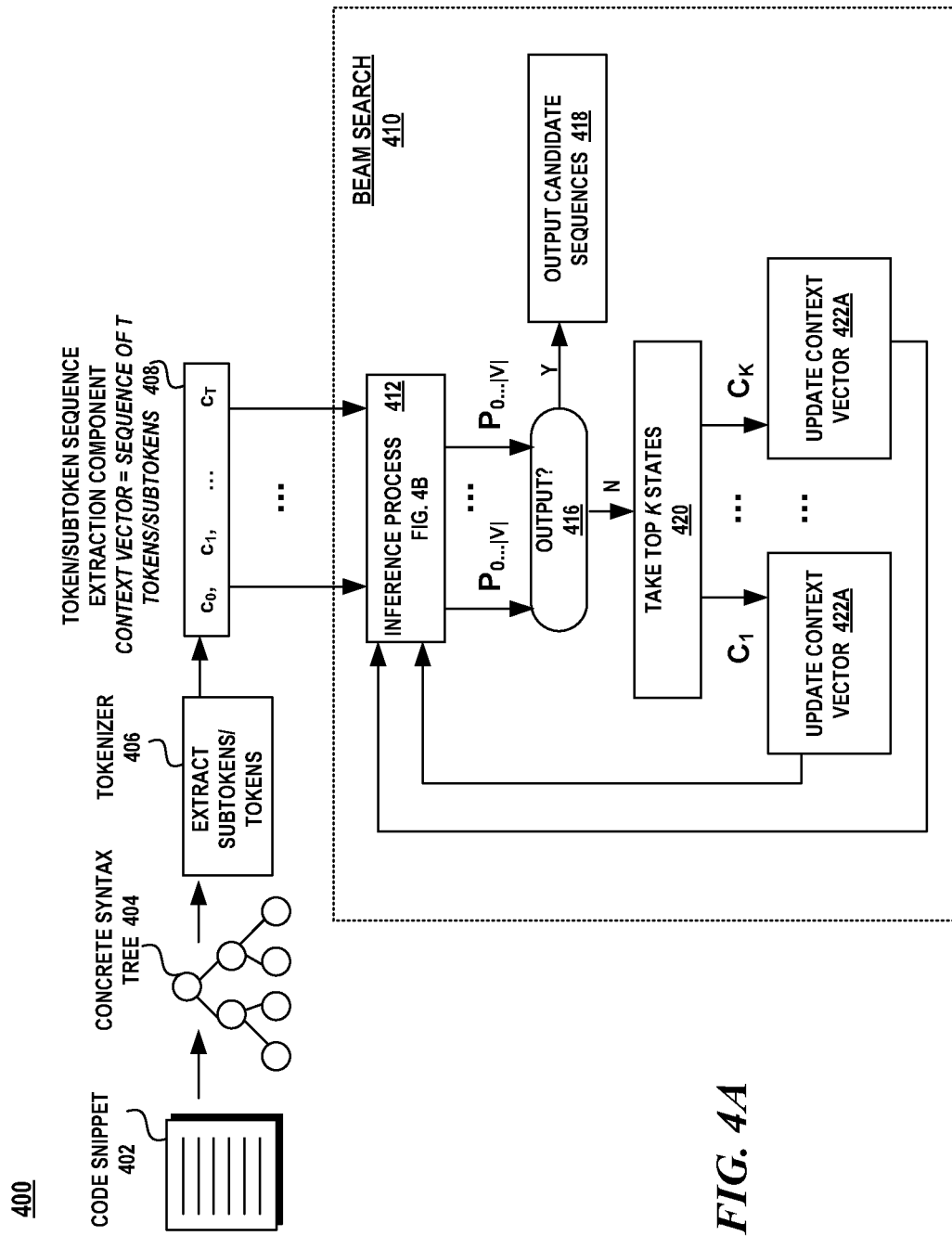
FIGS. 4A-4B are schematic diagrams illustrating an exemplary architecture of the inference phase.

Turning to FIG. 4A, there is shown components of the inference phase 400. A code snippet 402 is entered into a source code editor which is transformed into a corresponding concrete syntax tree 404. The concrete syntax tree 404 is traversed, by a tokenizer 406, to extract tokens and/or subtokens. Ordered sequences of length T are formed and vectorized 408.

The beam search 410 uses the context vector 408 to initiate an inference process 412 using the probability distribution generated from the neural transformer model, $P_0 \ldots P_{|V|}$ (block 412). If the probability distribution indicates that an end-of-line token is the most likely token to follow in a partial candidate sequence (block 416—yes), then the top k candidate sequences are output (block 418). Otherwise, the beam search 410 takes the top k states or tokens/subtokens identified from the probability distribution generated by the neural transformer model in the inference process (block 420). A new context vector is generated for each of the k states, $c_1, \ldots c_k$, using the new token/subtoken in the context vector (blocks 422A, 422B). The new context vectors are then input into the inference process (blocks 422A, 422B, 412). The beam search 410 ends when the end-of-line token is selected as the most likely candidate to complete a partial candidate sequence.

Figure 4B:
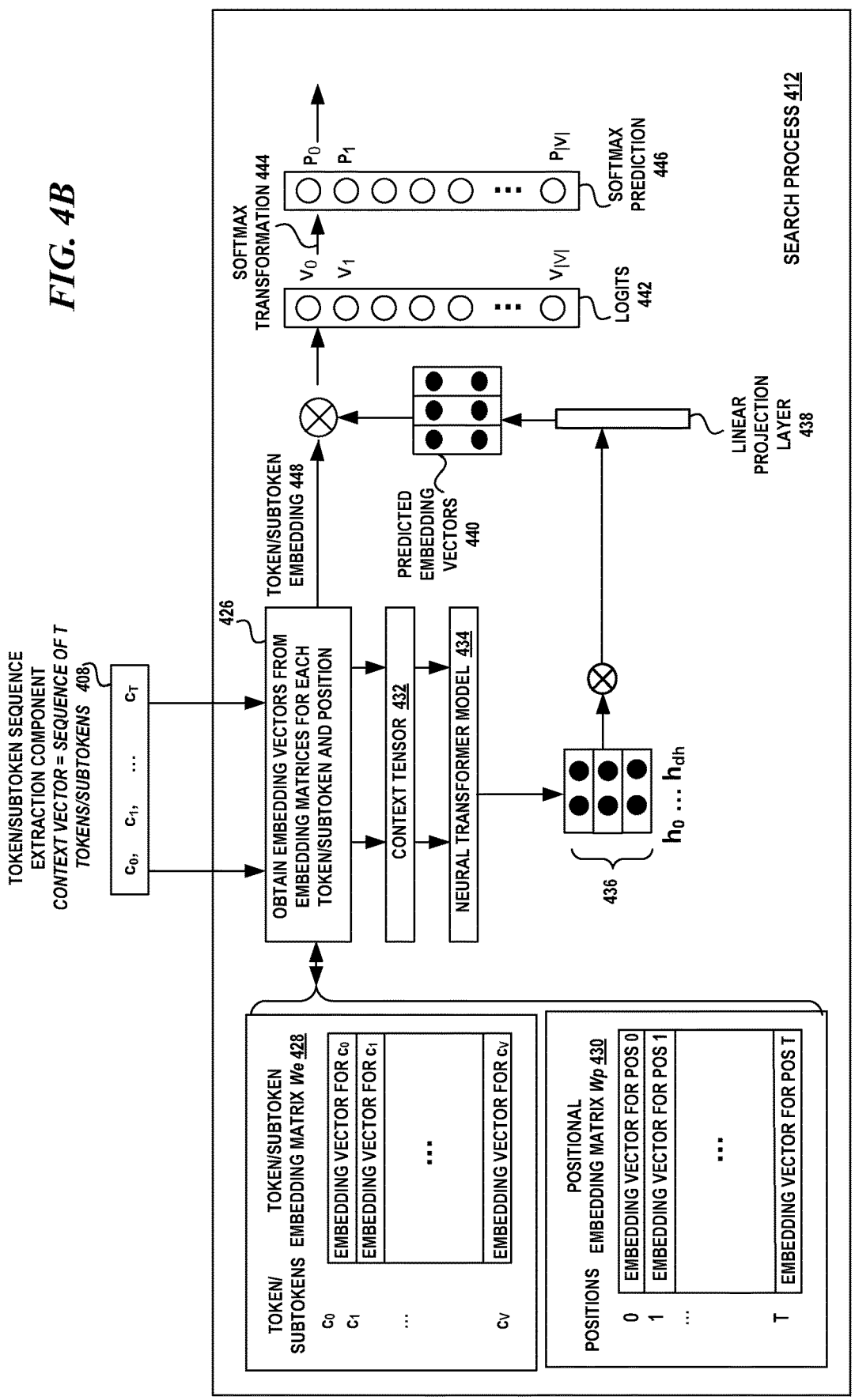

FIG. 4B illustrates an exemplary search process 412. An embedding vector for each token and subtoken in a sequence 408 is obtained from the token/subtoken embedding matrix 428 and its corresponding positional vector from the positional embedding matrix 430. The token/subtoken embedding vector and its corresponding positional embedding vector are combined to form a context tensor 432 which is input into the neural transformer model 434.

The output of the neural transformer model 434 is the vector with components $h_0 \ldots h_{dh}$ 436. The output of the transformer is multiplied by the linear projection layer 438 to generate the predicted embedding vectors 440. The token/subtoken embedding vectors 448 are used as the output classification matrix to generate the unnormalized predictions or logits $V_0 \ldots V_{|V|}$ 442. The logits 442 are normalized using the softmax function 444 to generate the softmax prediction 446 $P_0 \ldots P_{|V|}$.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5A:
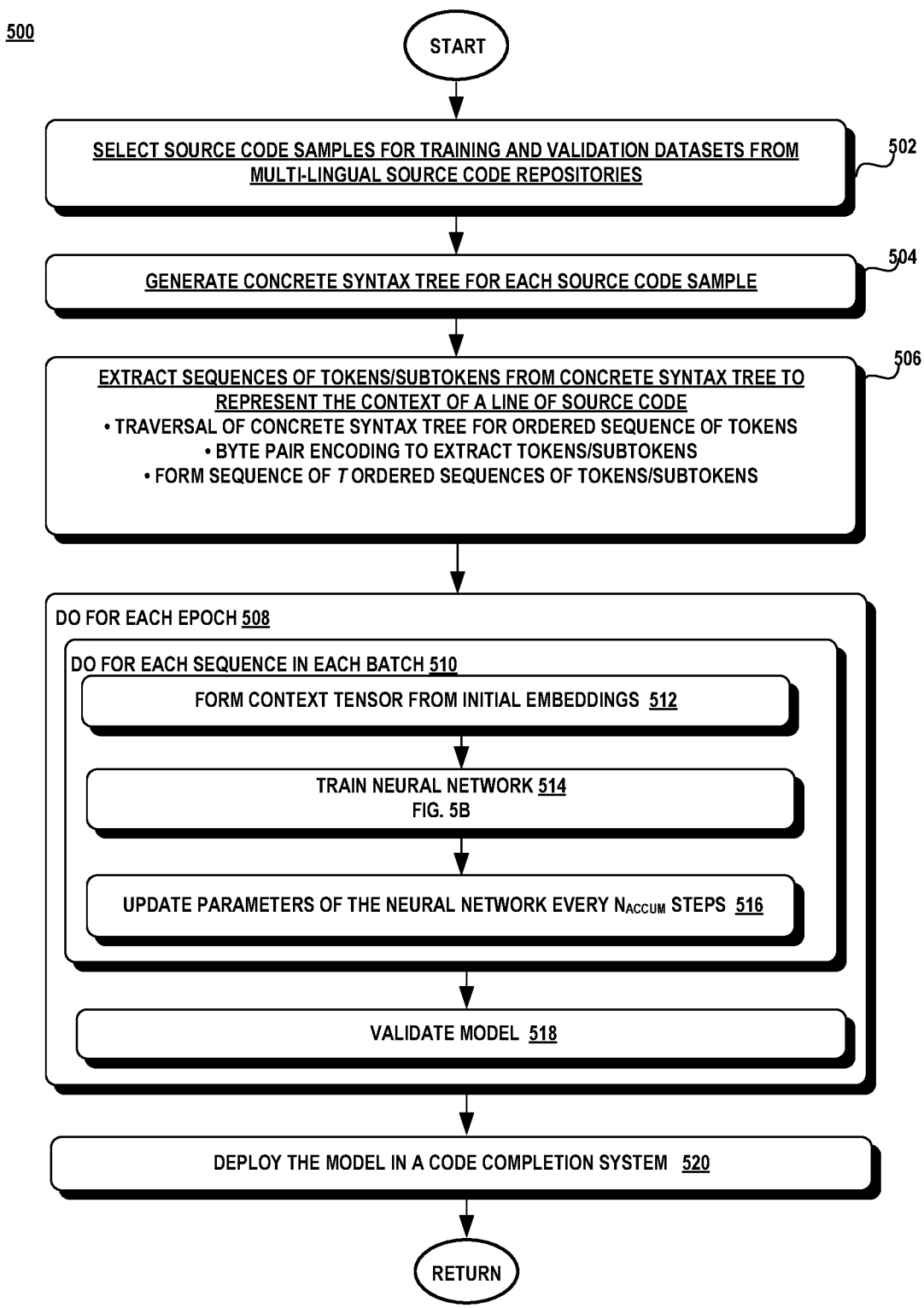
FIGS. 5A-5B are flow diagrams illustrating an exemplary method for training the neural transformer model for code completion.
Figure 5B:
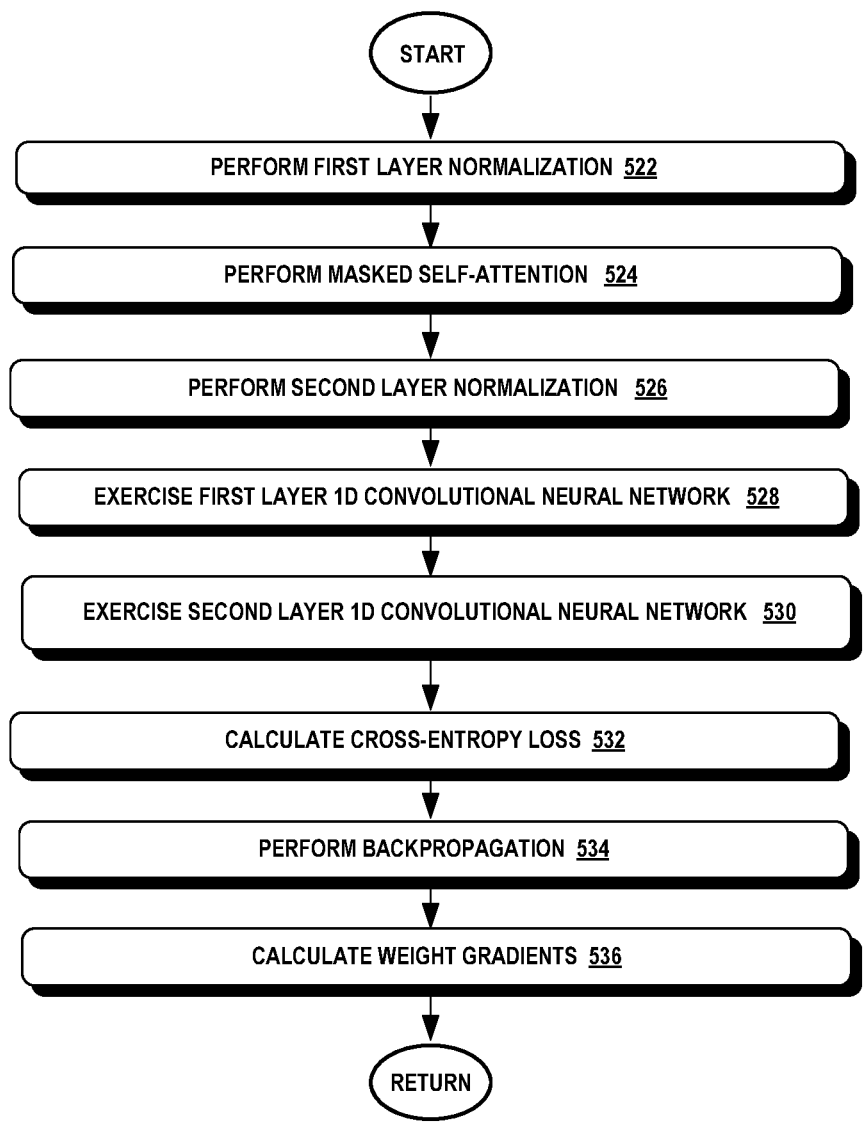

FIGS. 5A-5B illustrate an exemplary method 500 illustrating usage of a neural transformer model for code completion. Before the neural transformer model is trained, a set of hyperparameters is selected randomly. A hyperparameter is a parameter associated with the neural network model architecture, the training algorithms, and data normalization, and is set before the start of the model training. A hyperparameter is not learned by the deep learning or neural network. The hyperparameters are selected at random from a set of categorical values or, for real valued hyperparameters like learning rate, drawn at random from a given range. Hyperparameters are tuned based on the performance of the neural transformer model when tested using the validation dataset.

The training of the neural transformer model is a computationally intensive effort which requires parallel data processing. One or more clusters may be used to train the neural transformer model where each cluster contains a set of loosely or tightly coupled computers (e.g., processors, processing units, cores) that perform the same task simultaneously under the control of distributed controller. Each computer works off the same copy of the neural transformer model and uses distributed data parallel training algorithms to synchronize the processing between the clusters.

The neural transformer model is trained using batching where the training dataset is partitioned into batches of a certain size and processed before the model is updated. The size of a batch must be more than or equal to one and less than or equal to the number of samples in the training dataset.

Referring to FIGS. 1 and 5A, one or more source code repositories 106 are searched for source code programs. Each source code program may be written in the same or in different programming languages. The source code repositories 106 can be widely-used code repositories, such as GitHub, internal code repositories, and/or combinations thereof. The source code extraction component 108 extracts a number and type of source code programs that meet an intended objective, such as source code programs that are accessed frequently, source code programs that utilize a particular function (e.g., database operations, computer graphics programs, asynchronous methods, etc.), and the like. These source code programs are used to generate training and validation datasets (collectively, block 502).

Each selected source code program 110 is then parsed and/or compiled by the compilation component 112 to produce a concrete syntax tree (block 504).

Byte pair encoding is used to generate an ordered sequence of tokens/subtokens representing a context of the source code program. The serialized sequence of syntax nodes and tokens is obtained from traversing the concrete syntax tree. In one aspect, the concrete syntax tree is traversed in depth first order (i.e., depth first search, depth first traversal). A depth first traversal starts at a root node and traverses the tree in a single path until it reaches a terminal or leaf node. The traversal then backtracks until it can choose another path to traverse. This process is repeated until all nodes are visited. Next, the token/subtoken sequences are transformed into numeric vectors. (Collectively, block 506).

A portion of the sequences are used as the training dataset and another portion is used as the validation dataset. The training dataset is partitioned into epochs and then the sequences in each epoch are partitioned into batches. Each sequence in each batch (block 510) in each epoch (block 508) is then used to train the neural transformer model (block 514). Initial values are generated for the token/sequence and position embeddings of each sequence which are then used to form a context tensor (block 512).

Referring now to FIG. 5B, a first layer normalization is applied to the context tensor (block 522) followed by masked self-attention (block 524). The output of the masked self-attention is input into a second layer normalization (block 526). The output of the second layer normalization is input into the first one-dimensional convolutional neural network layer (block 528). The output of the first one-dimensional convolutional neural network layer is then input into the second one-dimensional convolutional neural network layer (block 530).

The neural networks are trained iteratively, making multiple passes over the training dataset before converging to a minimum. Each training iteration includes forward propagation (blocks 528-530), loss calculation (block 532), backpropagation steps (block 534) followed by updating the weights by calculating the weight gradients (block 536).

The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as close as possible to zero using a gradient descent technique. In one aspect, a Stochastic Gradient Descent (SGD) method is the optimization algorithm used to find the values of parameters of the function that minimizes the loss function. A backpropagation through time (BPTT) algorithm maybe used to update the weights.

Referring back to FIG. 5A, at the completion of each batch, the parameters of the neural network are updated at a preconfigured frequency denoted as $N_{ACCUM}$ (block 516). $N_{ACCUM}$ is a gradient accumulation frequency and in one aspect has a value of 8. The parameters include the token/subtoken embeddings, the positional embeddings which are stored in a respective embedding matrix. Other parameters include the parameters of the attention layers and the convolutional layers.

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved (collectively, block 518).

Evaluation metrics are used to test the quality of the candidate recommendations. In one aspect, a top-k accuracy method is used using mean reciprocal rank (MRR) to perform the evaluation. Top-k accuracy is defined as:

$$Acc(k) = \frac{N_{top-k}}{Q},$$

and MMR is defined as:

$$MRR = \frac{1}{Q}\sum_{i=1}^{Q}\frac{1}{rank_i},$$

where $N_{top-k}$ denotes the number of relevant recommendations in the top k suggestions, Q represents the total number of test data samples, and rank is the prediction rank of a recommendation.

Accuracy in the top-1 indicates how often the top recommendation is correct, while the top-5 accuracy indicates how often the top three recommendations in the list contain the candidate the user is looking for. The MRR captures the rank of the result, thus providing information outside of the top candidate. A larger value of the MRR indicates the overall smaller rank numbers of correct recommendations. (collectively, block 518).

Upon completion of the model validation, the model is ready to be deployed in a code completion system (block 520). Attention now turns to a discussion of an exemplary method illustrating an inference phase using the neural transformer model is a code completion system.

Figure 6A:
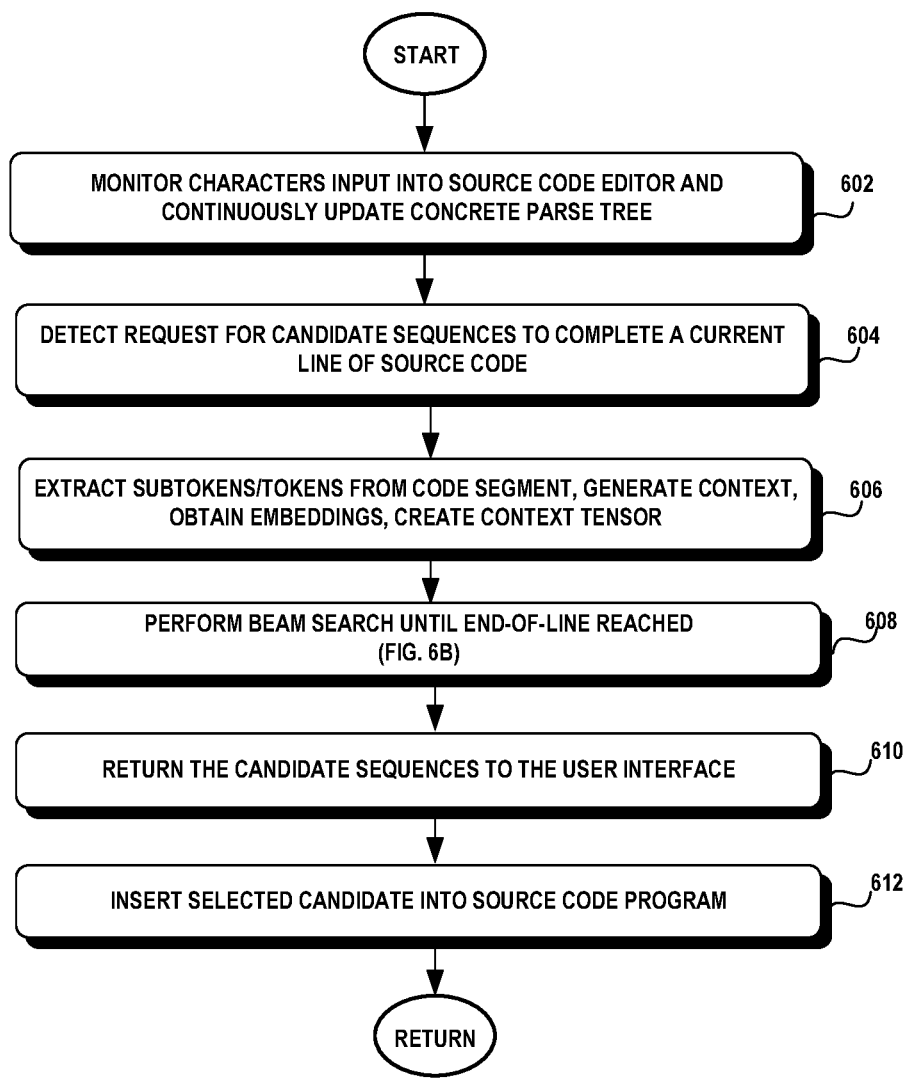
FIGS. 6A-6B are flow diagrams illustrating an exemplary method for utilizing the neural transformer model in the inference phase.
Figure 6B:
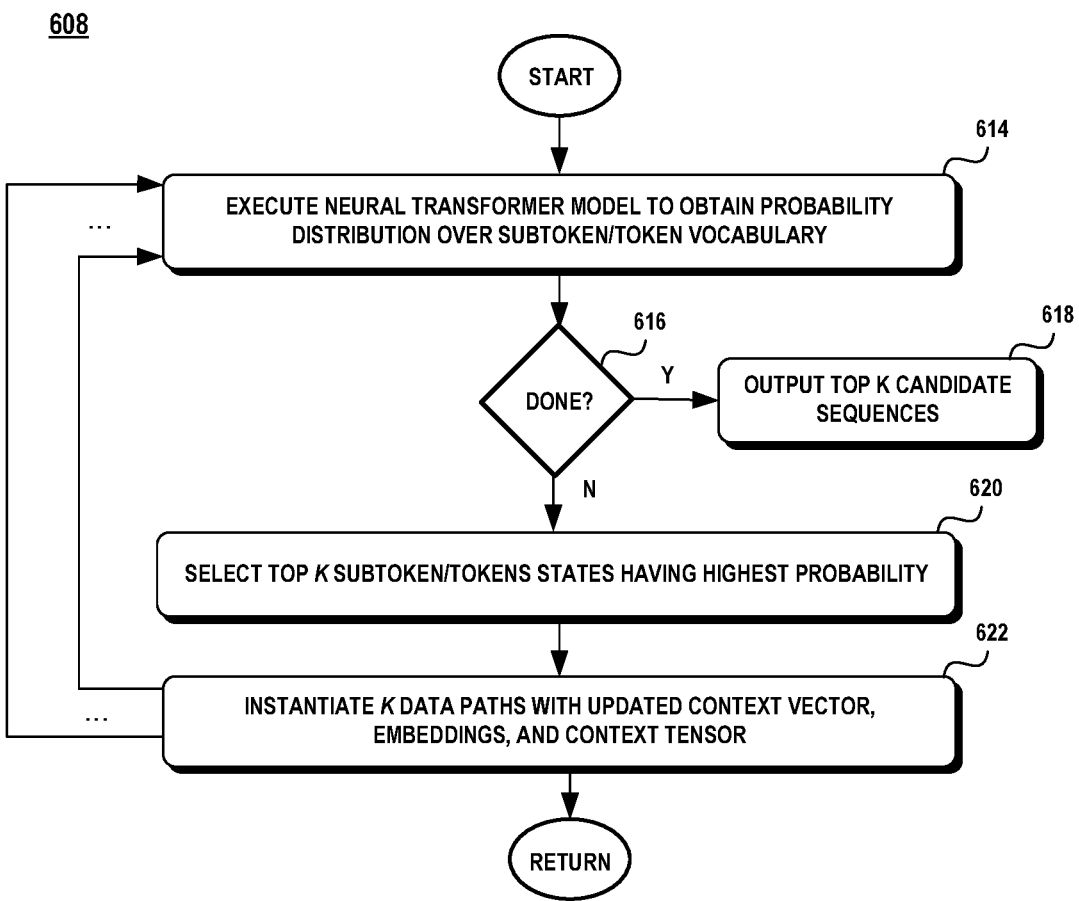

FIGS. 6A-6B illustrate an exemplary method 600, 608 of line-of-code completion utilizing the neural transformer model. Referring to FIGS. 1 and 6A, code completion is performed in a development environment such as a source code editor 130. The source code editor 130 is configured to interact with a code completion component 142 that performs a beam search that utilizes the neural transformer model. The source code editor 130 performs a background parsing process that monitors the characters input into the source code editor and continuously parses the source code to update the concrete syntax tree representing the source code of the current line of code (block 602).

The user interface 132 of the source code editor 130 detects a request for candidate sequences to finish the current line of source code. The request may be initiated by a marker character, such as an equal sign "=", in which the code completion system will provide candidate sequences to complete the rest of the expression after the equal sign. (Collectively, block 604).

Alternatively, the user may request candidates by entering a particular keystroke or sequence of keystrokes, such as the combination of the CTRL key with the whitespace key. In yet another aspect, the system may automatically display, in a dimmed color, a single top candidate at the end of the current source code line regardless of a marker character. The system builds and continuously updates a tree of candidates in the background regardless of whether the user decides to trigger the candidate or not. The candidate is automatically displayed in the user interface when the user has been idle for a period of time. If the user wants to accept the candidate, the user may type in a particular keystroke or combination of keystrokes (e.g., CTRL and I) to accept the candidate. In this case, the cursor position will advance to the end of the suggested code sequence and the dimmed color of the candidate code will change to the normal color of the code. If the user does not want to use the candidate, the candidate disappears when the user continues typing. In this case, the system would refine the code sequence based on the pre-fix filter of the tree of candidates based on the newly typed code. (Collectively, block 604).

Upon detection of the request for a candidate sequence, the concrete syntax tree is parsed to extract tokens/subtokens from the current code segment. Embeddings are obtained from the token/subtoken embedding matrix and the positional matrix. A context tensor is generated from the embeddings. (Collectively, block 606).

A beam search is then performed until the probability distribution indicates that the next likely token is the end-of-line token (block 608).

Referring to FIG. 6B, the beam search uses the neural transformer model with the context tensor to generate a probability distribution for the token/subtoken vocabulary (block 614). If the probability distribution indicates that the next likely token is the end-of-line token, then the beam search is finished (block 616—yes) and the top k candidate sequences are output (block 618).

Otherwise, the top k tokens/subtokens to complete a partial sequence are selected (block 620).

Each of the selected tokens/subtokens is then input in a respective context vector and has a separate data path through the neural transformer model again. The context vector utilizes the selected token/subtoken in the current context vector with the last token/subtoken removed. The new context vector will consist of T token/subtokens with the selected token/subtoken $c_k$ added to the beginning of the sequence with the last token/subtoken removed from the sequence. If the current context vector consists of a token/subtoken sequence consisting of $c_0, c_1, \ldots, C_T$, then the new context vector will consist of $c_k, c_0, c_1, \ldots, c_{T-1}$. (Collectively, block 622).

Referring back to FIG. 6A, the beam search keeps track of the generated sequences in the search tree and returns the top candidate sequences to the user interface component for display to the user (block 610). A user may select one of the candidates which is then input into the source code program to complete the line of source code (block 612). Alternatively, the user may disregard the candidate sequences and continue typing. The process is repeated (blocks 602-612) until the user closes the source code program, exits the source code editor or terminates the code completion tool.

Line-of-Code Completion Example

Figure 7:
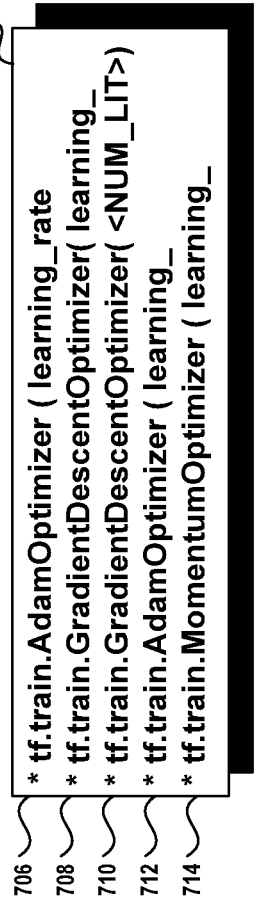
FIG. 7 is a schematic diagram illustrating an exemplary user interface showing code completion candidates for a line of code in an exemplary source code program.

Attention now turns to an exemplary user interface display for a code completion tool using the techniques described herein. Turning to FIG. 7, there is shown a source code program being edited in a source code editor. The user interface shows lines 10-36 of the source code program 702. A pop-up window 704 appears at line 36 after the "=" character is input by a user. The pop-up window 704 contains five candidate sequences to complete the line of code at line 36. The five candidates 706-714 are shown in a ranked order from highest probability to least probability. Each candidate is an ordered sequence of tokens that is likely to complete the expression of line 36.

Figure 8:
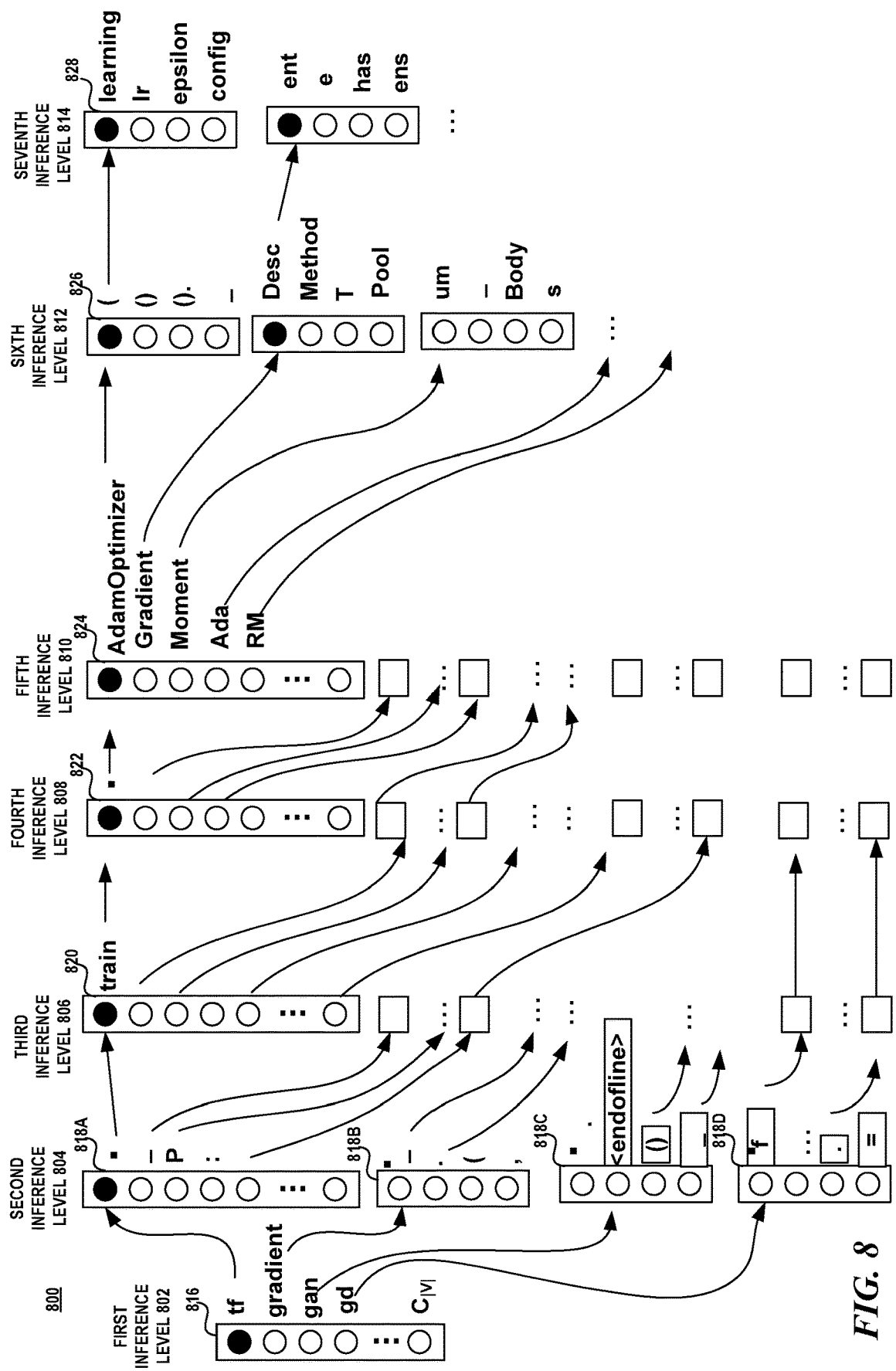
FIG. 8 is a schematic diagram illustrating an exemplary beam search that generates a search tree of candidate sequences.

FIG. 8 is an illustration of a search tree 800 generated from a beam search for the source code snippet shown in FIG. 7. The search tree 800 tracks all states generated by the neural transformer model in the nodes of the search tree. In this example, the beam width is set to four (4). At the first inference level or execution of the neural transformer model 802, the beam search generates a root node 816 with a probability distribution for each token/subtoken in the vocabulary. The top four tokens/subtokens are then selected, which are, "tf", "gradient", "gan", and "gd". Each selected token is added to a separate context vector which is then used in a subsequent execution of the neural transformer model. The probability distribution resulting from each invocation of the neural transformer model 818A-818D is shown for each of the token/subtokens in the second inference level 804.

The top four tokens/subtokens are then selected from each node in the second inference level 804 from which a new context vector is generated. A third invocation of the neural transformer model is made with new nodes generated from each selected token/subtoken from the second inference level 804 which is shown in the third inference level 806. This process is repeated again until the search ends. FIG. 8 shows search tree 800 resulting from the first seven inference levels, 802, 804, 806, 808, 810, 812, 814.

As shown in FIG. 8, the candidate sequence tf.train.AdamOptimizer (learning_rate is composed of tokens/subtokens tf inferred in the root node 816, the token/subtoken "." inferred from a node 818A in the second inference level 804, the token/subtoken train inferred from node 820 at the third inference level 806, the token/subtoken "." inferred from node 822 at the fourth inference level 808, the token/subtoken AdamOptimizer inferred from node 824 at the fifth inference level 810, the token/subtoken "(" inferred from a node 826 at the sixth inference level 812, and the token/subtoken learning inferred from node 828 at the seventh inference level 814.

Exemplary Operating Environment

Figure 9:
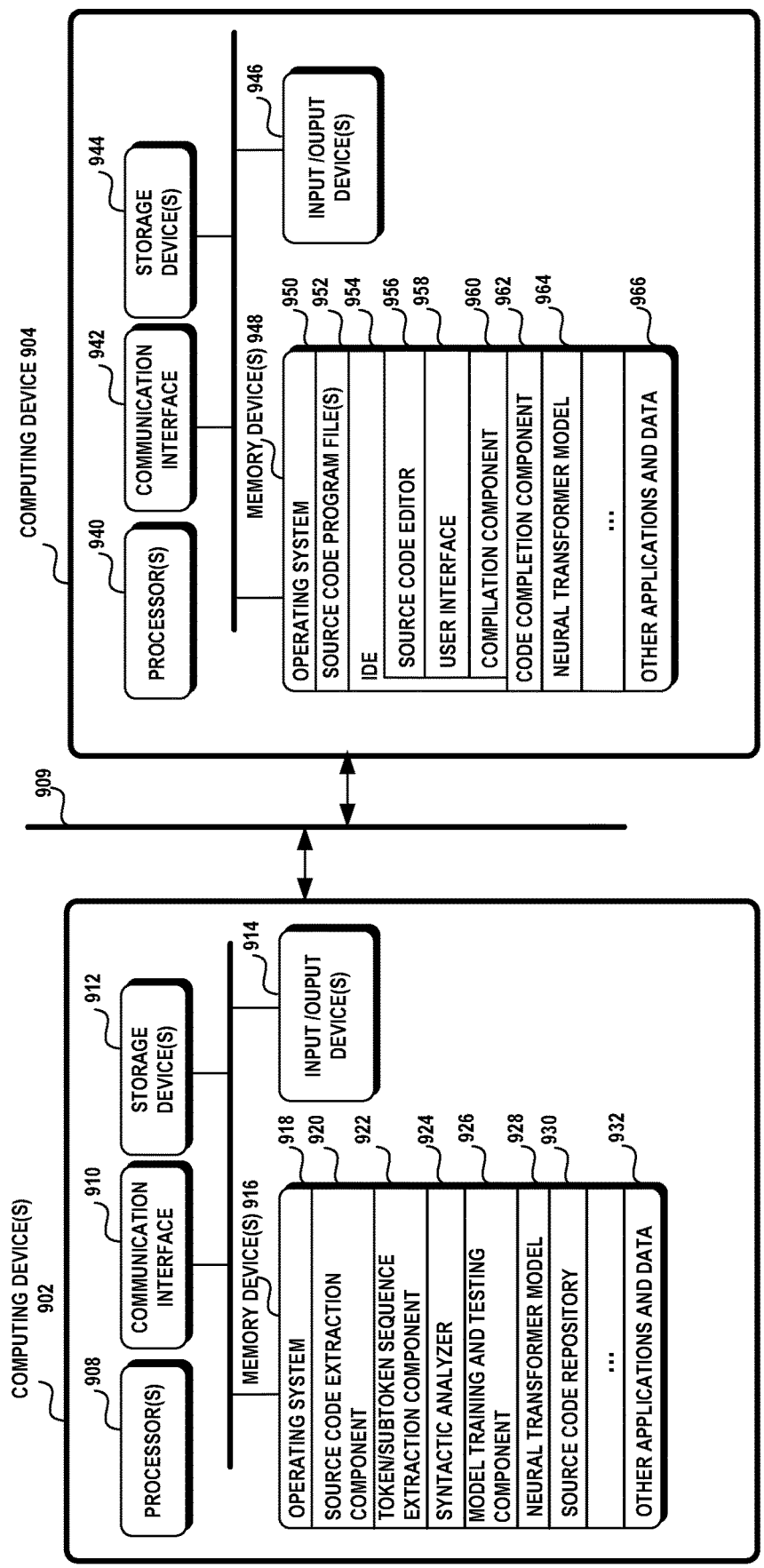
FIG. 9 is a block diagram illustrating an operating environment.

Attention now turns to a discussion of an exemplary operating environment. FIG. 9 illustrates an exemplary operating environment 900 in which one or more computing devices 902 is used to train the neural transformer model and a second computing device 904 uses the neural transformer model for code completion. However, it should be noted that the aspects disclosed herein is not constrained to any particular configuration of devices. Any one of the computing devices 902, 904 may utilize the neural transformer model in its own code completion system and computing device 904 may generate and test the neural transformer model as well. Computing devices 902 may be configured as a cloud service that generates the neural transformer model as a service for other code completion systems. It should be noted that the operating environment is not limited to any particular configuration and other configurations are possible.

The computing devices 902, 904 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

The computing devices 902, 904 may include one or more processors 908, 940, one or more communication interfaces 910, 942, one or more storage devices 912, 944, one or more input/output devices 914, 949, and one or more memory devices 919, 948. A processor 908, 940 may be any commercially available or customized processor and may include dual microprocessors and multi-processor architectures. A communication interface 910, 942 facilitates wired or wireless communications between the computing device 902, 904 and other devices. A storage device 912, 944 may be computer-readable medium that does not contain propagating signals, such as modulated data signals transmitted through a carrier wave. Examples of a storage device 912, 944 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 912, 944 in the computing devices 902, 904. The input/output devices 914, 946 may include a keyboard, mouse, pen, voice input device, touch input device, display, speakers, printers, etc., and any combination thereof.

A memory device 916, 948 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 916, 948 may also include one or more external storage devices or remotely located storage devices that do not pertain to propagated signals, such as modulated data signals transmitted through a carrier wave.

Computing device 904 may utilize an integrated development environment (IDE) 954 that allows a user (e.g., developer, programmer, designer, coder, etc.) to design, code, compile, test, run, edit, debug or build a program, set of programs, web sites, web applications, and web services in a computer system. Software programs can include source code files, created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 954 may provide a native code development environment or may provide a managed code development that runs on a virtual machine or may provide a combination thereof. The IDE 954 may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code program files 952 according to known software programming techniques and the specific logical and syntactical rules associated with a particular source language via a user interface 958 and a source code editor 956 in the IDE 954. Thereafter, the source code program files 952 can be compiled via a compilation component 960 generating data structures representing the syntactic structure and semantic model of the source code.

The memory device 948 of computing device 904 may contain instructions, components, and data. A component is a software program that performs a specific function and is otherwise known as a module, program, and/or application. The memory device 948 may include an operating system 950, one or more source code program files 952, an IDE 954 that may include a source code editor 956, a user interface 958, a compilation component 960, a code completion component 962 and a neural transformer model 964 and other applications and data 966.

The memory device 916 of the computing devices 902 may include an operating system 918, a source code extraction component 920, a token/subtoken sequence extraction component 922, a syntactic analyzer 924, a model training and testing component 926, a neural transformer model 928, a source code repository 930, and other applications and data 932.

The computing devices 902, 904 may be communicatively coupled via a network 909. The network 909 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 909 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising one or more processors and a memory that stores one or more programs that are configured to be executed by the one or more processors. The one or more programs including instructions that: track a sequence of characters entered into a line of a source code program during an editing session; and at a position in the line of the source code program, generate a candidate sequence to complete the line of source code using a neural transformer model, wherein the neural transformer model is trained on an unsupervised dataset of source code programs written in one or more different programming languages.

The system includes further instructions that when executed by the one or more processors: initiate a beam search to build a search tree to generate the candidate sequence, wherein the search tree includes one or more nodes at one or more inference levels, each node represents an output probability distribution for a set of tokens of a vocabulary of the neural transformer model, wherein the output probability distribution is generated from the neural transformer model, each node expands k tokens/subtokens to a next inference level. The beam search iteratively expands the search tree by invoking the neural transformer model to predict a next token given a sequence of tokens representing a partial candidate to complete the line-of-code.

In one aspect, the neural transformer model is composed of only decoder blocks. The neural transformer model includes at least one decoder block having a masked self-attention layer. The neural transformer model includes at least one one-dimensional convolutional neural network layer.

The system tracks the sequence of characters entered into the line of the source code program by obtaining a sequence of tokens/subtokens representing a current context of the line of code and finding token/subtoken embedding vectors and positional embedding vectors for the sequence of tokens/subtokens. The token/subtoken embedding vectors and the positional embedding vectors are pre-trained.

The system includes instructions that input the token/subtoken embedding vectors and positional embedding vectors into the neural transformer model. The neural transformer model generates a probability distribution for the tokens/subtokens of a model vocabulary.

A method is disclosed comprising: monitoring each token input into a line-of-code of a source code program during a source code development session; iteratively executing a beam search to generate token candidates to complete the line-of-code as a new token is input into the line-of-code, wherein the beam search generates a token candidate using a matrix of token probabilities generated from a neural transformer model; concatenating the token candidates into candidate sequences to complete the line-of-code; and outputting at least one candidate sequence upon detection of a marker character input in the line-of-code during the source code development session.

The method further comprises invoking the neural transformer model to predict a next token given a context vector representing a context of the line-of-code including the new token.

In one aspect, the neural transformer model includes a self-attention layer and a convolutional neural network. The self-attention layer is preceded by layer normalization and layer normalization is applied to the outputs of the self-attention layer. The neural transformer model utilizes token embeddings and positional embeddings representing a context of the line-of-code, wherein the token embeddings and the positional embeddings are pre-trained.

In another aspect, the monitoring of each token input into the source code program further comprises: parsing the input into a concrete syntax tree; performing byte pair encoding to extract tokens from the concrete syntax tree; and concatenating ordered sequences of tokens of length T.

A device is disclosed comprising at least one processor coupled to a memory device. The at least one processor is configured to: extract one or more ordered sequences of tokens from a plurality of source code programs, wherein an ordered sequence of tokens represents a context of a segment of source code from a select one of the plurality of source code programs; and utilize the ordered sequences of tokens to train a neural transformer model to predict a next token to complete a partial sequence of tokens, wherein the partial sequence of tokens is used to produce a candidate sequence of tokens that complete a line-of-code in a target source code program, wherein the neural transformer model includes an attention layer and at least one convolutional neural network layer.

In one aspect, the ordered sequence of tokens includes one or more subtokens. The neural transformer block is a decoder-only transformer. In some aspects, at least two of the plurality of source code programs are written in a different programming language and the ordered sequences of tokens are an unsupervised training dataset. In some aspects, the neural transformer model generates a matrix of token probabilities that are used to predict a next token to succeed in a predicted candidate sequence.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
extracting a plurality of ordered sequences of tokens from a plurality of source code programs, wherein an ordered sequence of tokens represents a context of a segment of source code from a select one of the plurality of source code programs; and
utilizing the plurality of ordered sequences of tokens to train a decoder-only neural transformer model with attention to learn to predict a next token to complete a partial sequence of tokens, wherein the partial sequence of tokens completes a line-of-code in a target source code program, wherein the decoder-only neural transformer model with attention includes one or more decoder blocks, each decoder block including an attention layer and a neural network layer.

2. The method of claim 1, wherein the attention layer includes a masked self-attention layer having a plurality of attention heads.

3. The method of claim 1, wherein the plurality of source code programs are of a same programming language.

4. The method of claim 1, wherein the plurality of source code programs includes at least two source code programs written in two different programming languages.

5. The method of claim 1, wherein the plurality of source code programs is from two or more domains.

6. The method of claim 1, further comprising:
parsing each of the plurality of source code programs into a concrete syntax tree; and
traversing each concrete syntax tree into the ordered sequence of tokens.

7. The method of claim 6, further comprising:
mapping the ordered sequence of tokens into a sequence of token embeddings and a sequence of positional embeddings.

8. A system, comprising:
at least one processor and a memory;
wherein the memory stores instructions that when executed on the at least one processor perform actions that:
obtain an unsupervised training dataset of a plurality of source code programs;
transform each of the plurality of source code programs into ordered sequences of tokens of a predetermined length, wherein an ordered sequence of tokens represents one or more lines of source code; and
train a decoder-only neural transformer model with attention with the ordered sequences of tokens to learn to predict a sequence of tokens to complete a line-of-code given a context of the line-of-code, wherein the context includes a sequence of tokens in the line-of-code, wherein the decoder-only neural transformer model with attention includes one or more decoder blocks, a decoder block including an attention layer and a neural network layer.

9. The system of claim 8, wherein the plurality of source code programs includes a first set of source code programs of a first programming language and a second set of source programs of a second programming language.

10. The system of claim 8, wherein the plurality of source code programs is of a same programming language.

11. The system of claim 8, wherein the memory stores instructions that when executed on the at least one processor perform actions that:
map the ordered sequence of tokens into a sequence of token embeddings and a sequence of positional embeddings.

12. The system of claim 11, wherein the sequence of token embeddings and the sequence of positional embeddings are input to train the decoder-only neural transformer with attention.

* * * * *